(12) United States Patent
Liu

(10) Patent No.: US 7,451,999 B1
(45) Date of Patent: Nov. 18, 2008

(54) TANDEM JOGGING STROLLER

(76) Inventor: Cheh-Kang Liu, 5F., No. 41, Alley 3, Lane 91, Sec. 4, Pa Te Rd., Taipei (TW)

(*) Notice: Subject to any disclaimer, the term of this patent is extended or adjusted under 35 U.S.C. 154(b) by 306 days.

(21) Appl. No.: 11/486,222

(22) Filed: Jul. 14, 2006

(51) Int. Cl.
*B62B 7/10* (2006.01)
(52) U.S. Cl. .................. 280/642; 280/647; 280/650
(58) Field of Classification Search ............ 280/642, 280/647, 650, 47.38, 47.4
See application file for complete search history.

(56) References Cited

U.S. PATENT DOCUMENTS

| | | | | |
|---|---|---|---|---|
| 4,542,915 A | * | 9/1985 | Wheeler et al. | ............ 280/642 |
| 5,167,425 A | * | 12/1992 | Chen | .................. 280/648 |
| 5,417,449 A | * | 5/1995 | Shamie | ............... 280/642 |
| 5,624,152 A | * | 4/1997 | Yoshie et al. | .......... 297/184.13 |
| 5,653,460 A | * | 8/1997 | Fogarty | ............... 280/642 |
| 5,769,448 A | * | 6/1998 | Wang | ................... 280/642 |
| 6,086,087 A | * | 7/2000 | Yang | ..................... 280/658 |
| 6,241,273 B1 | * | 6/2001 | Gehr | ...................... 280/642 |
| 6,676,140 B1 | * | 1/2004 | Gondobintoro | ........ 280/33.993 |
| 6,843,498 B2 | * | 1/2005 | Bretschger et al. | ......... 280/642 |
| 6,935,652 B2 | * | 8/2005 | Fair et al. | ................ 280/642 |
| 6,979,017 B2 | * | 12/2005 | Chen | ....................... 280/642 |
| 2008/0088115 A1 | * | 4/2008 | Yang et al. | ................ 280/642 |

* cited by examiner

*Primary Examiner*—Jeffrey J Restifo
(74) *Attorney, Agent, or Firm*—Troxell Law Office PLLC

(57) ABSTRACT

A tandem jogging stroller is disclosed formed of a handlebar, two rear-seat rear frame bars, a rear wheel axle, two rear-seat front frame bars, two rear-seat side frame bars, a movable bracket, two rear bottom frame bars, two front bottom frame bars, two front-seat front frame bars, two front-seat rear frame bars, a front wheel bracket, and a handlebar control mechanism. The two front bottom frame bars are respectively connected to the movable bracket, and the movable bracket is coupled to and movable along the rear bottom frame bars. When collapsing the tandem jogging stroller, the movable bracket and the front bottom frame bars are moved backwards along the rear bottom frame bars to reduce the size for storage.

3 Claims, 12 Drawing Sheets

TANDEM JOGGING STROLLER

BACKGROUND AND SUMMARY OF THE INVENTION

The present invention relates to a jogging stroller and more particularly, to a tandem jogging stroller that can easily be folded up to reduce the size for storage and delivery.

When wishing to collapse a conventional single-seat jogging stroller 9, as shown in FIGS. 1 and 2, the user must turn the two retaining blocks 92 about the associating bottom ends of the handlebar 91 to the unlocking position to disengage the respective retaining grooves 921 from the top ends 931 of the respective front frame bars 93, and then turn the handlebar 91 downwardly backwards to the received position.

Further, various tandem jogging strollers have been disclosed, and have appeared on the market. For the sake of stability and safety, the size of the frame structure, wheels and other related parts must be relatively greater than a regular baby cart.

The present invention has been accomplished under the circumstances in view. It is the main object of the present invention to provide a tandem jogging stroller, which is foldable to reduce the size for storage and delivery. According to one aspect of the present invention, the tandem jogging stroller is comprised of a handlebar, two rear-seat rear frame bars, a rear wheel axle, two rear-seat front frame bars, two rear-seat side frame bars, a movable bracket, two rear bottom frame bars, two front bottom frame bars, two front-seat front frame bars, two front-seat rear frame bars, a front wheel bracket, and a handlebar control mechanism. The two front bottom frame bars are respectively connected to the movable bracket, and the movable bracket is coupled to and movable along the rear bottom frame bars. When collapsing the tandem jogging stroller, the movable bracket and the front bottom frame bars are moved backwards along the rear bottom frame bars to reduce the size for storage.

According to another aspect of the present invention, the movable bracket can be used as a footplate for the resting of the legs of the young child sitting on the rear seat of the tandem jogging stroller.

DETAILED DESCRIPTION OF THE INVENTION

Figure 1:
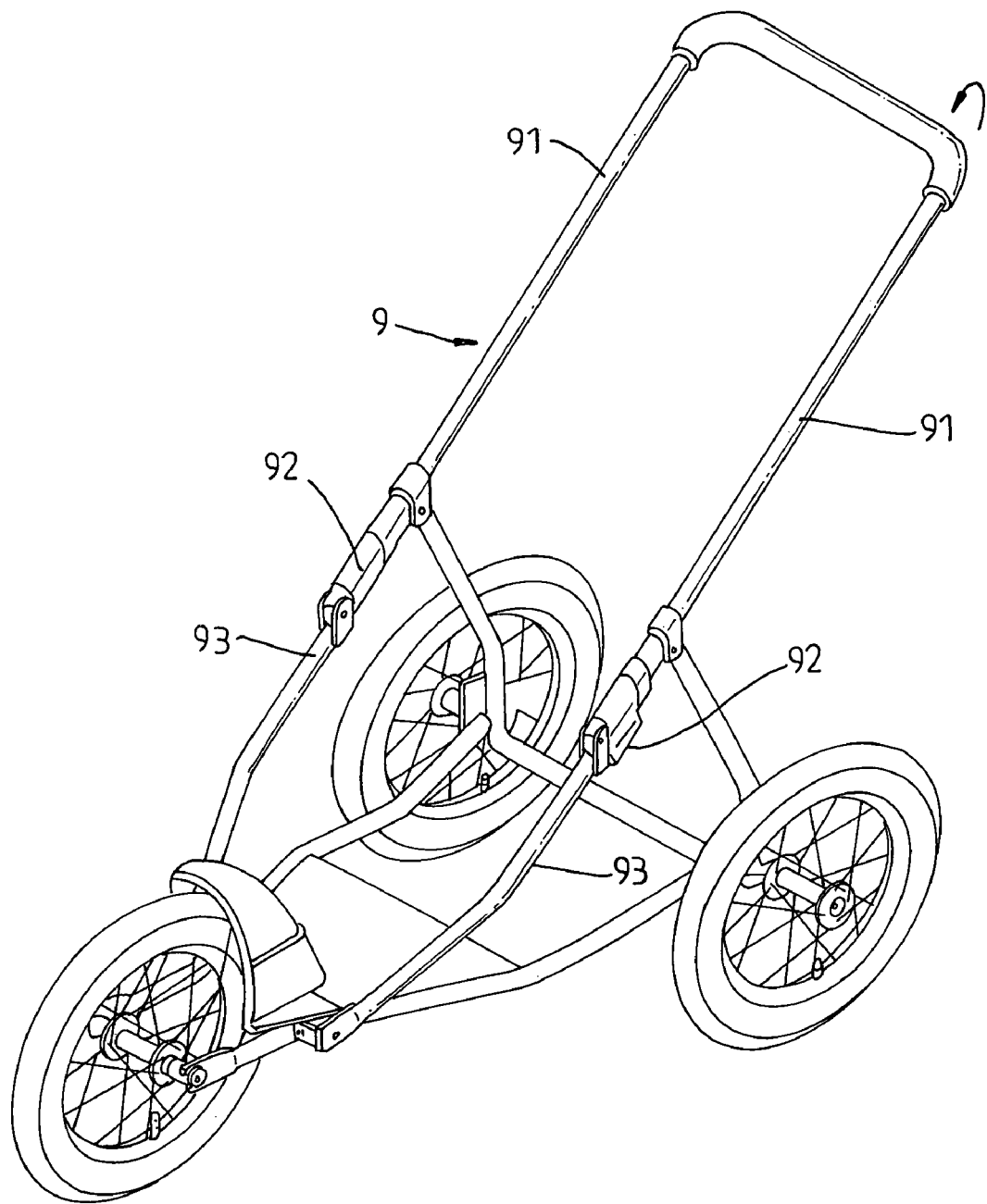
FIG. 1 is an elevational view of the frame structure of a single-seat jogging stroller according to the prior art.
Figure 2:
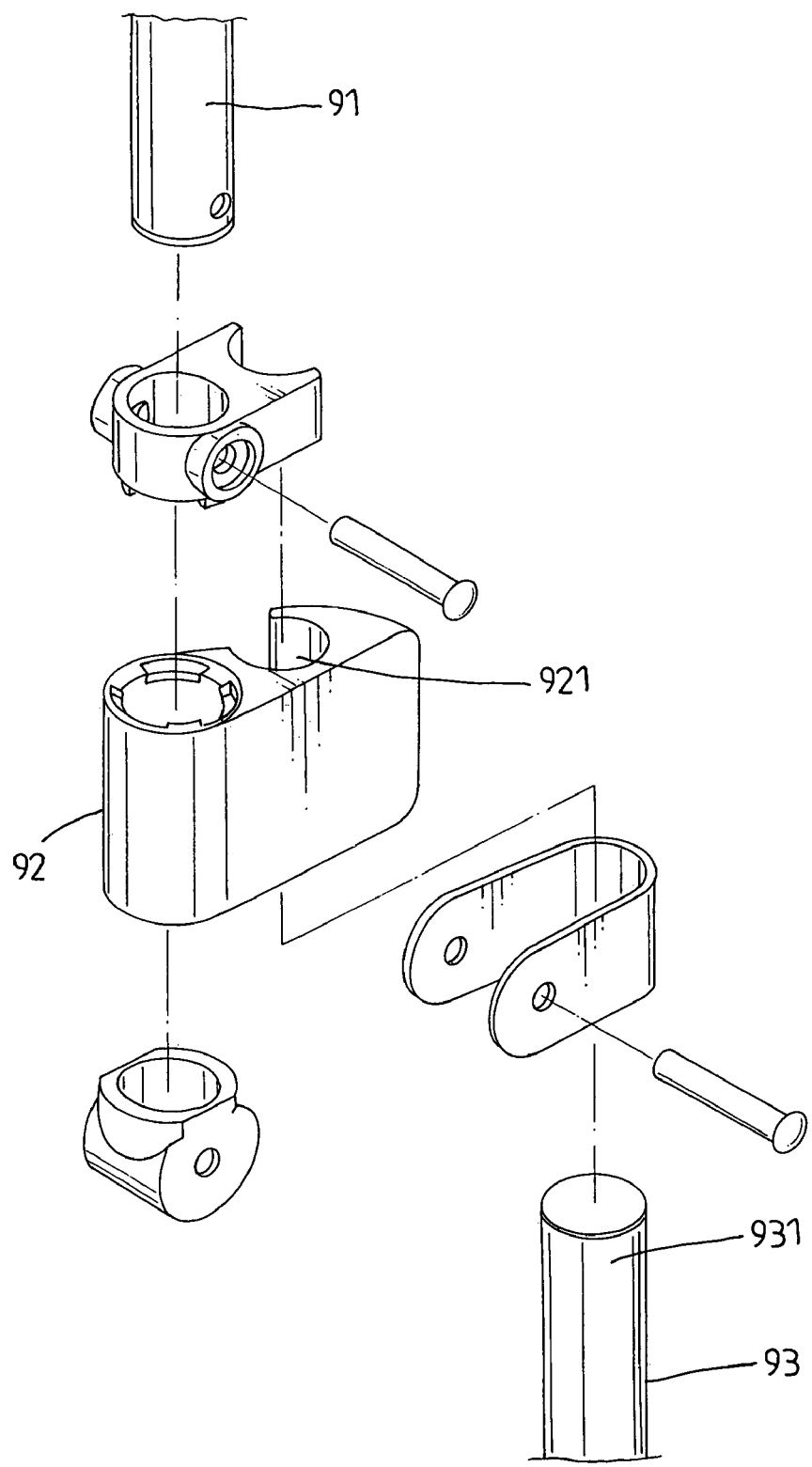
FIG. 2 is an exploded view in an enlarged scale of a part of the single-seat jogging stroller according to the prior art.
Figure 3:
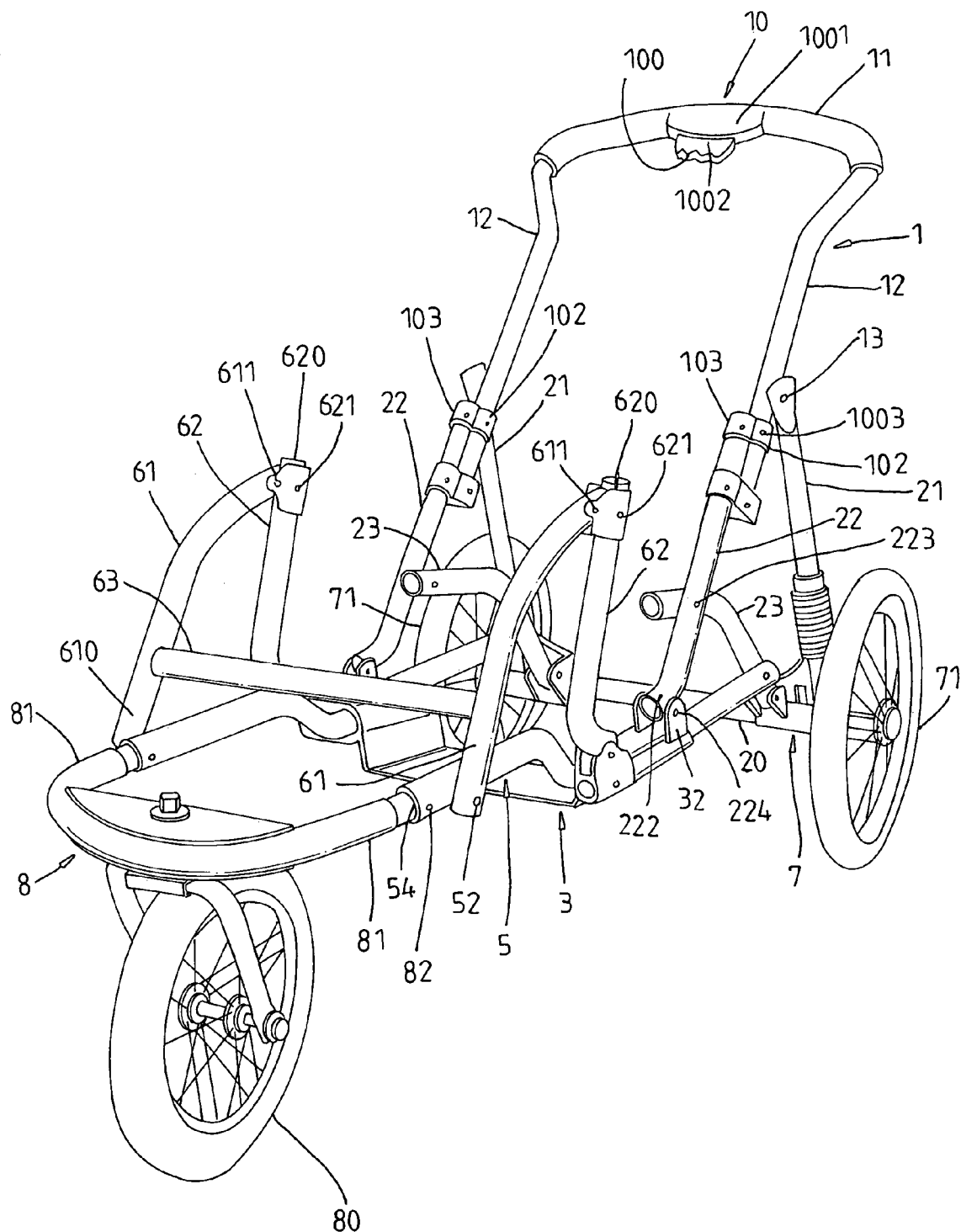
FIG. 3 is an elevational view of the frame structure of a tandem jogging stroller in accordance with the present invention.
Figure 4:
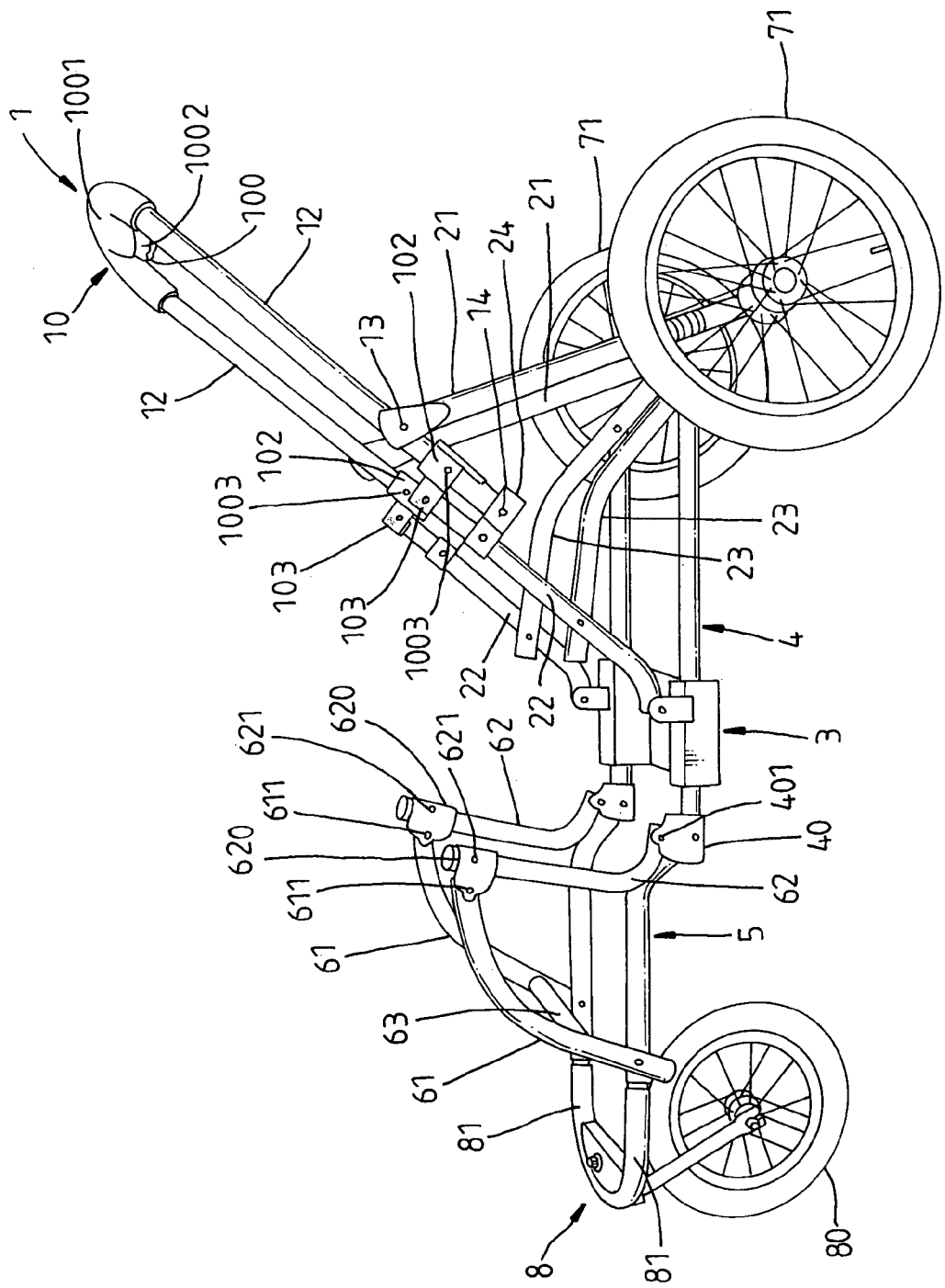
FIG. 4 is a side elevation of FIG. 3.
Figure 5:
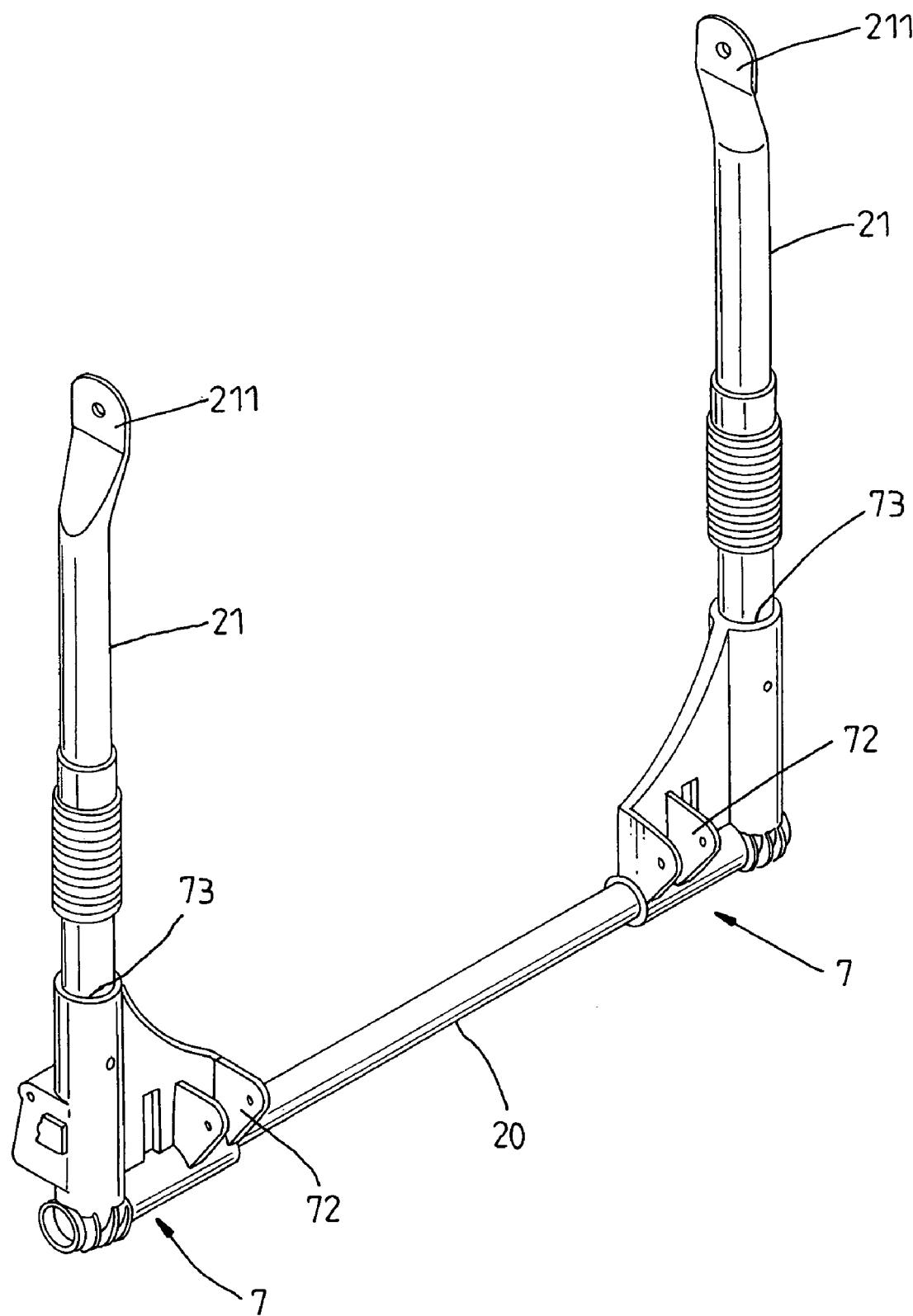
FIG. 5 is an elevational view in an enlarged scale of a part of the present invention, showing the rear wheel axle and the two rear-seat rear frame bars connected together.
Figure 6:
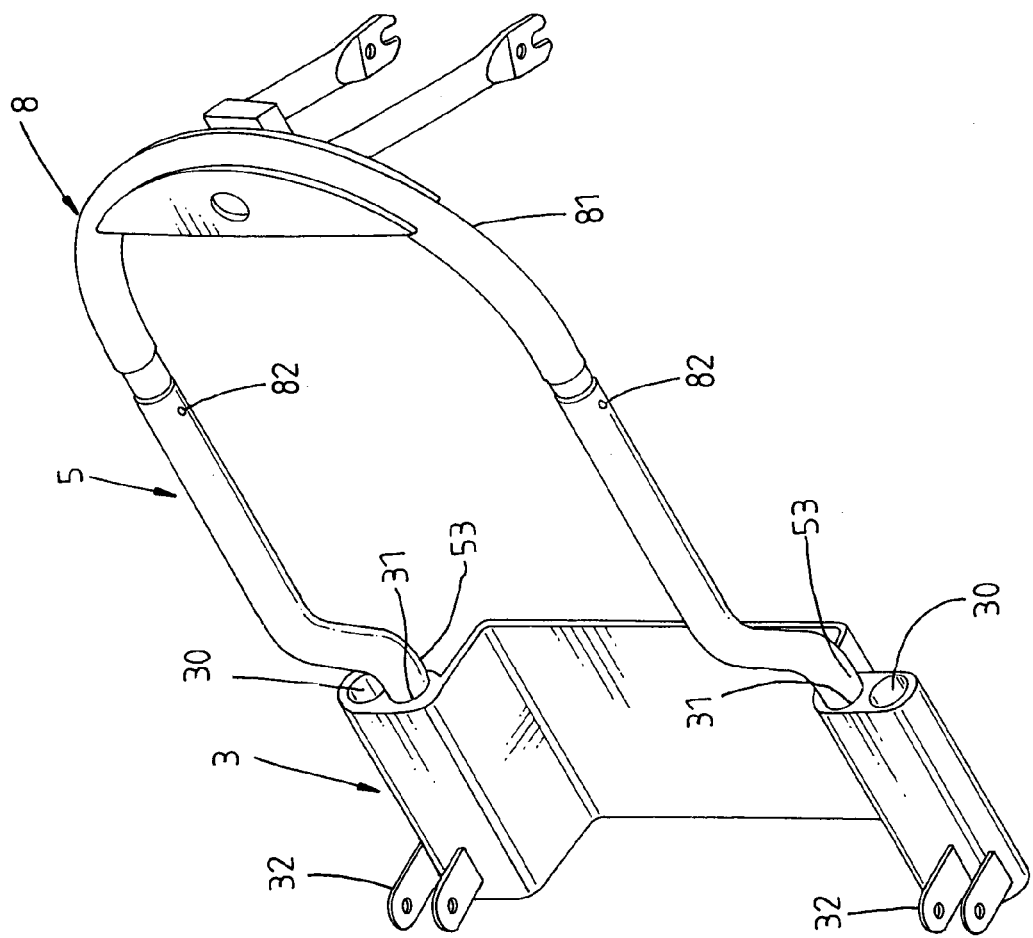
FIG. 6 is an elevational view in an enlarged scale of a part of the present invention, showing the movable bracket, the front bottom frame bars and the front wheel bracket connected together.
Figure 7:
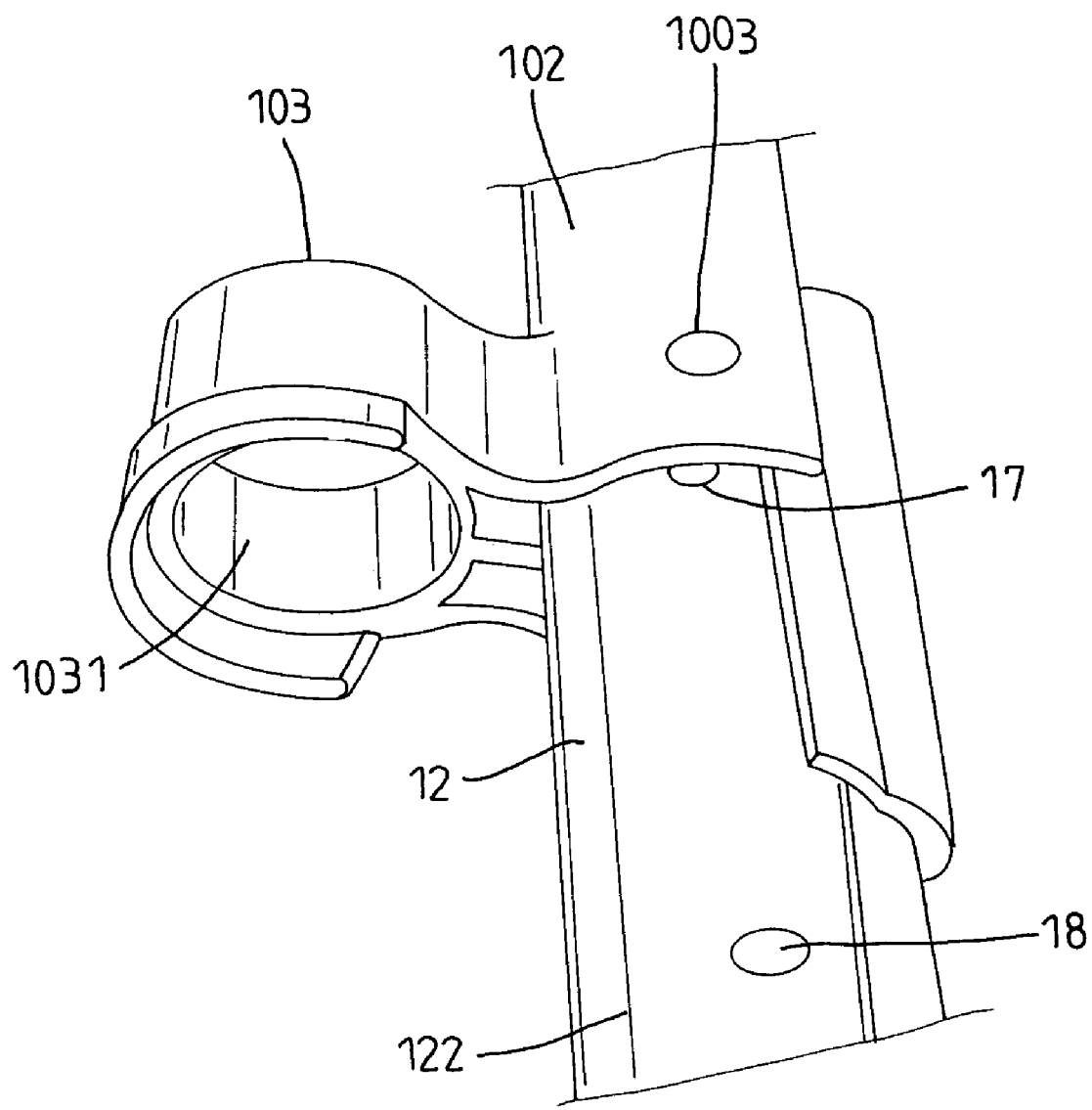
FIG. 7 is an elevational view in an enlarge scale of a part of the present invention, showing the coupling block coupled to the associating end rod.
Figure 8:
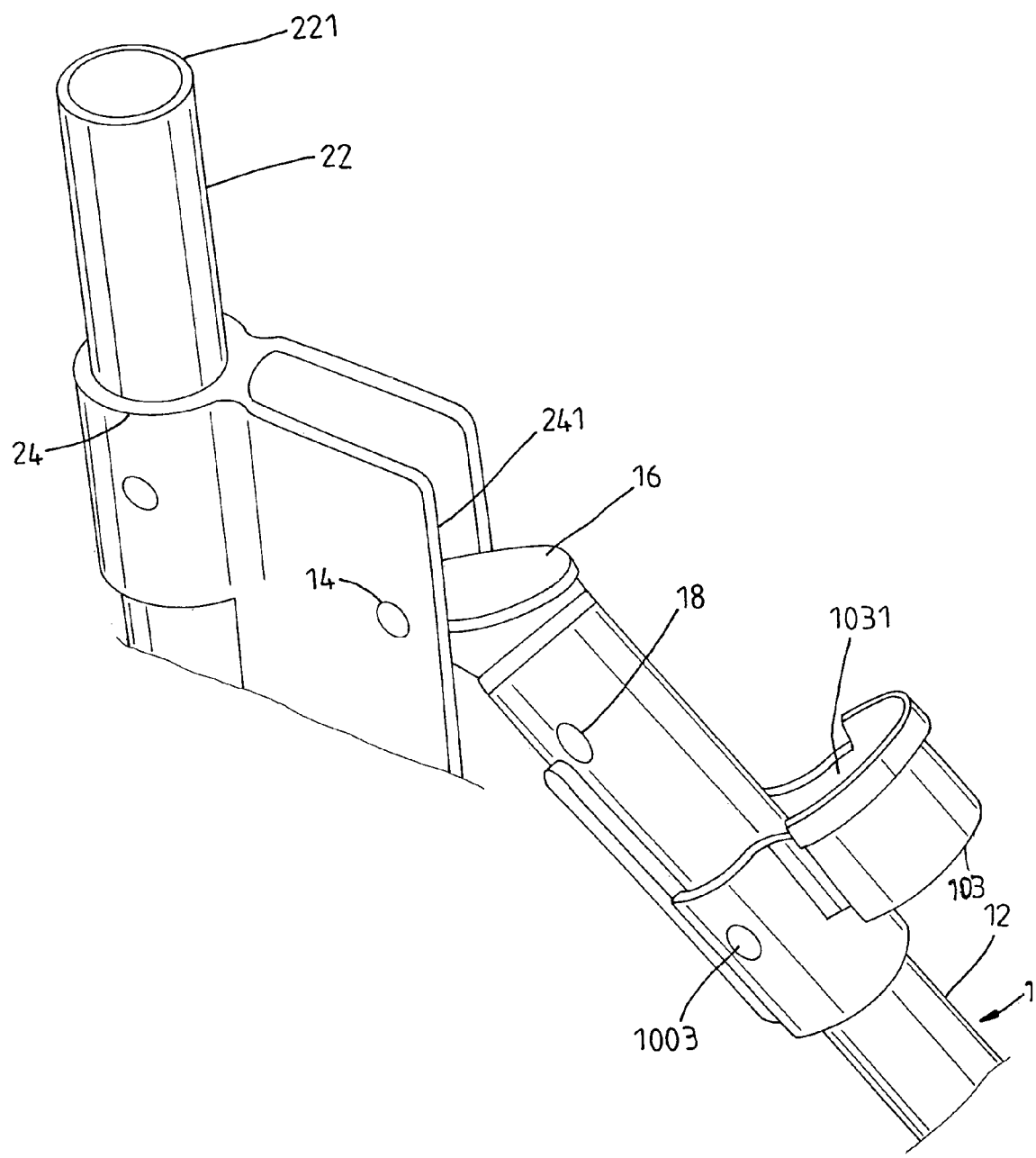
FIG. 8 is an elevational view in an enlarge scale of a part of the present invention, showing the connector of the end rod pivoted to the two parallel mounting walls of the locating frame of the associating rear-seat front frame bar, and cap disengaged from the top end of the associating rear-seat front frame bar.
Figure 9:
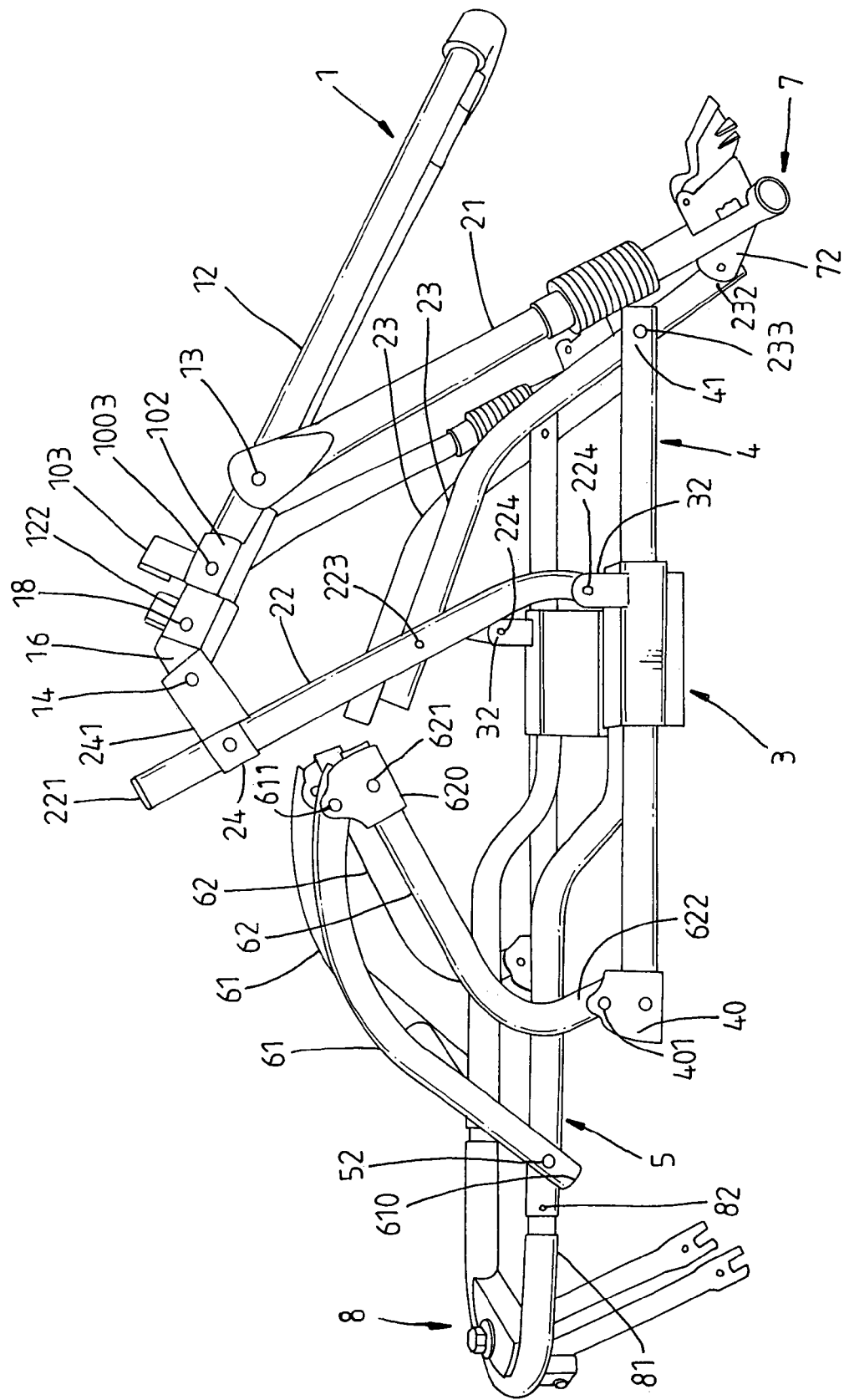
FIG. 9 is a schematic drawing showing the handlebar turned backwardly downwards after removal of the front and rear wheels according to the present invention.
Figure 10:
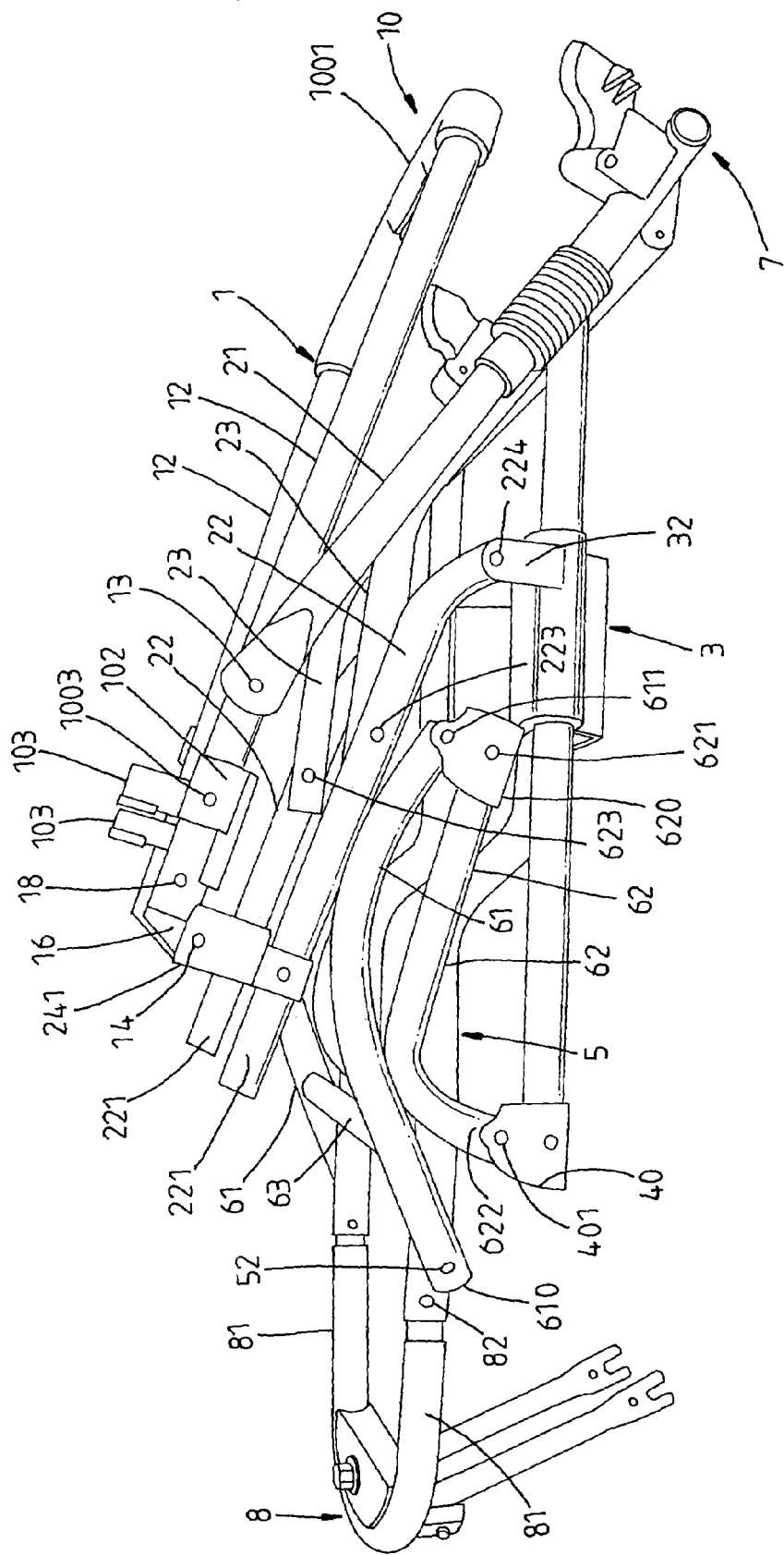
FIG. 10 corresponds to FIG. 9, showing the handlebar collapsed.
Figure 11:
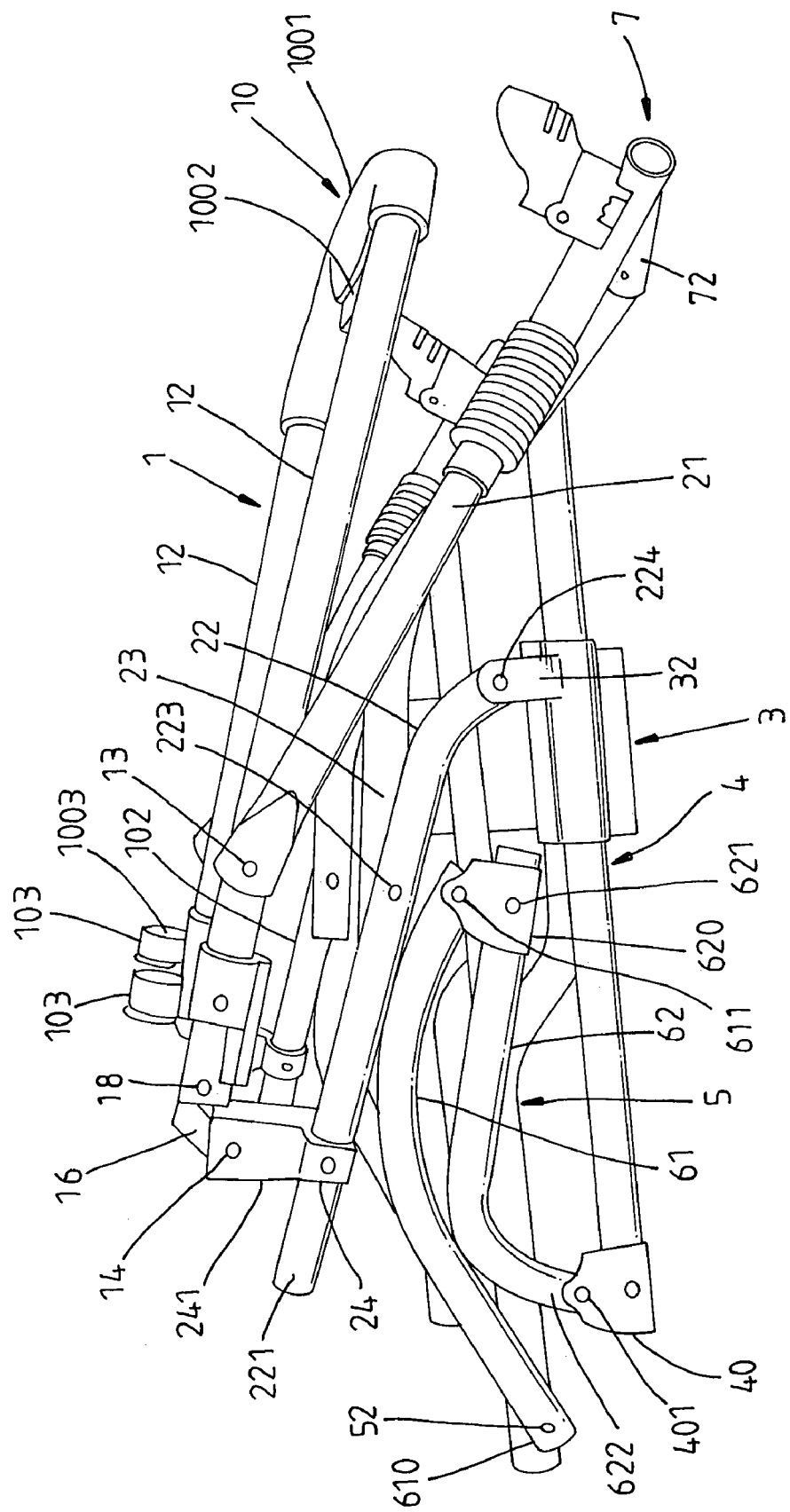
FIG. 11 is similar to FIG. 10 but showing the front wheel bracket removed.
Figure 12:
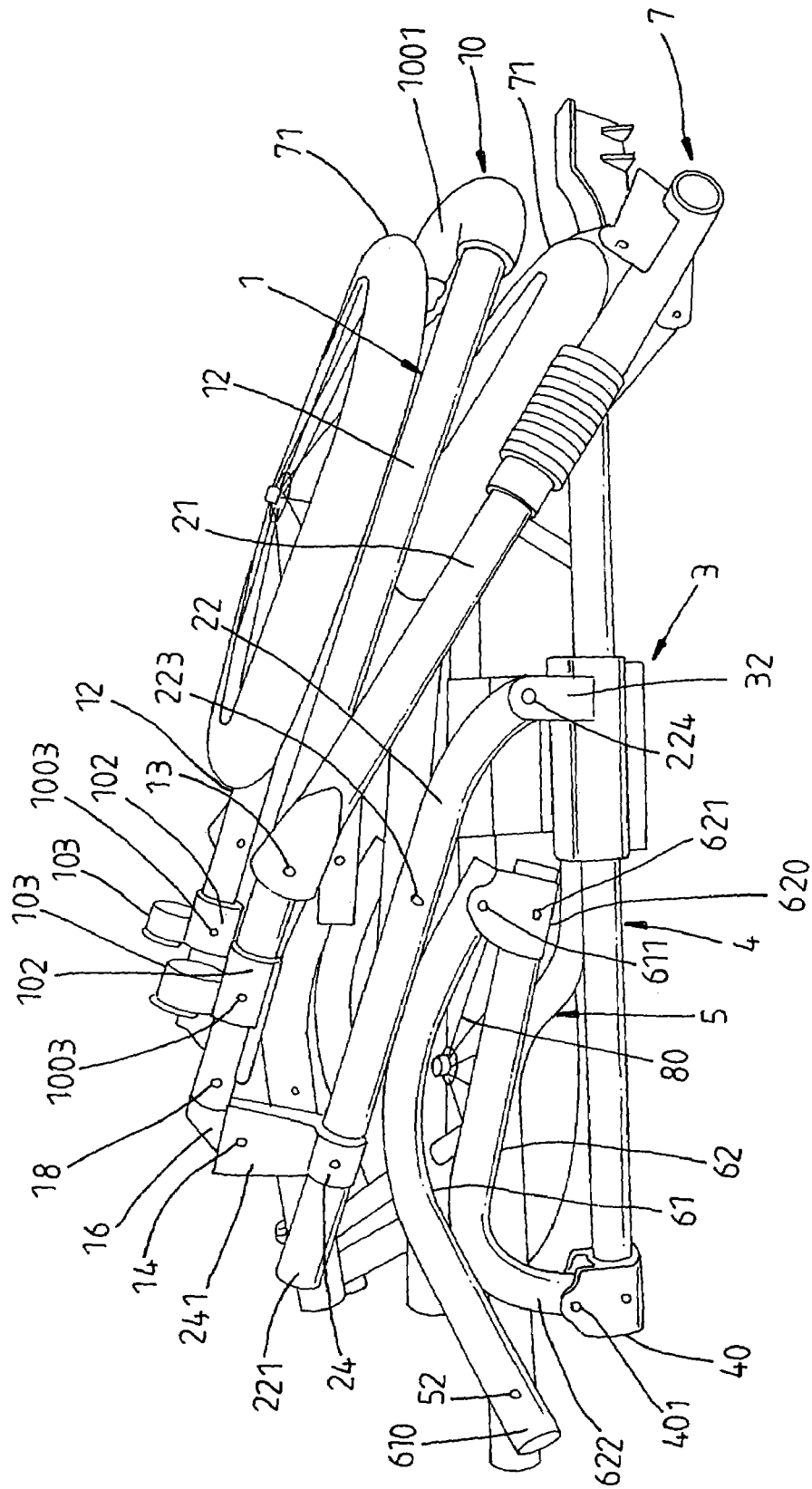
FIG. 12 corresponds to FIG. 11, showing the front and rear wheel and the front wheel bracket attached to the collapsed frame structure of the tandem jogging stroller.

Referring to FIG. 3~12 a tandem jogging stroller in accordance with the present invention is shown comprised of a handlebar 1, two rear-seat rear frame bars 21, a rear wheel axle 20, two rear-seat front frame bars 22, two rear-seat side frame bars 23, a movable bracket 3, two rear bottom frame bars 4, two front bottom frame bars 5, two front-seat front frame bars 61, two front-seat rear frame bars 62, a front wheel bracket 8, and a handlebar control mechanism 10.

The handlebar 1 comprises a transversely extending grip 11 and two end rods 12 respectively extended from the two ends of the grip 11 and arranged in parallel. The two end rods 12 are tubular rod members each having a longitudinal sliding slot 13, and a connector 16 fixedly fastened to the bottom end 122 thereof with a fastening device 18.

The rear wheel axle 20 has two wheel holders 7 respectively affixed to the two distal ends thereof to support a respective rear wheel 71. The wheel holders 7 each have a barrel 73 and a lug 72 (see FIG. 5).

The two rear-seat rear frame bars 21 each have a top end 211 respectively pivoted to the end rods 12 of the handlebar 1 with a respective pivot pin 13, and a bottom end respectively connected to the barrels 73 of the wheel holders 7 at the two ends of the rear wheel axle 20.

The two rear-seat front frame bars 22 are respectively coupled to the end rods 12 of the handlebar 1, each having a top end 221, a locating frame 24 fixedly provided near the top end 221, the locating frame 24 having two parallel mounting walls 241 pivotally connected to the connector 16 of the associating end rod 12 of the handlebar 1 with a pivot pin 14, and a bottom end 222 respectively coupled to the movable bracket 3.

The two rear-seat side frame bars 23 each have a front end respectively pivoted to the rear-seat front frame bars 22 with a respective pivot pin 223 (see FIGS. 3 and 9), and a rear end 232 respectively pivoted to the lugs 72 of the wheel holders 7 at the two ends of the rear wheel axle 20.

The movable bracket 3 comprises two side frames 31, two sliding holes 30 respectively formed in the side frames 31 (see FIG. 6), and two pairs of upright lugs 32 respectively extended from the side frames 31 and respectively pivoted to the bottom ends 222 of the two rear-seat front frame bars 22 with a respective pivot pin 224.

The two rear bottom frame bars 4 are respectively inserted through the sliding holes 30 of the movable bracket 3, each having a rear end 41 respectively pivoted to the rear-seat side frame bars 23 with a respective pivot pin 233, a front end fixedly mounted with a locating frame 40.

The two front bottom frame bars 5 are tubular bars each having a rear end 53 respectively connected to the side frames 31 of the movable bracket 3, a front end, and a coupling hole 54 respectively axially formed in the front end.

The two front-seat rear frame bars 62 each have a bottom end 622 respectively pivoted to the locating frames 40 of the rear bottom frame bars 4 with a respective pivot pin 401, and a top end 621 fixedly mounted with a locating frame 620.

The two front-seat front frame bars 61 each have a top end 611 respectively pivoted to the locating frames 620 of the two front-seat rear frame bars 62, and a bottom end 610 respectively pivoted to the front ends of the two front bottom frame bars 5 with a respective pivot pin 52. Further, a reinforcing rod 63 is connected between the two front-seat front frame bars 61.

The front wheel bracket 8 has two side bars 81 respectively inserted into the coupling holes 54 of the two front bottom frame bars 5 and locked thereto with a respective spring latch 82, and a front wheel 80 pivotally supported on the front bottom side thereof.

The handlebar control mechanism 10 is controllable to lock the handlebar 1 to the two rear-seat front frame bars 22, or to unlock the handlebar 1 from the two rear-seat front frame bars 22 for allowing the handlebar 1 to be turned relative to the rear-seat front frame bars 22 between the extended operative position and the received non-operative position. The handlebar control mechanism 10 comprises two locating blocks 102, and an operating unit 100 operable to move the two locating blocks 102 up and down between the locking position and the unlocking position. The coupling blocks 102 are respectively slidably coupled to the longitudinal sliding slots 13 of the two end rods 12 of the handlebar 1 with a respective pivot pin 1003 (see FIG. 7), each having a cap 103 fixedly provided at one side. The cap 103 defines therein a constraint hole 1031 (see FIGS. 7 and 9) for receiving the top end 221 of the associating rear-seat front frame bar 22. The operating unit 100 comprises a holder block 1001 fixedly provided at the grip 11 of the handlebar 1, a press member 1002 coupled to the holder block 1001 through a slip joint, two cables (not shown) respectively received in the end rods 12 of the handlebar 1 connected between the press member 1002 and the pivot pins 1003, and two spring members (not shown) respectively connected between the pivot pins 1003 and the end rods 12. The spring members (not shown) impart a pressure to the associating pivot pins 1003 to move the pivot pins 1003 to the bottom ends of the associating sliding slots 17 respectively, thereby holding the caps 103 of the associating locating blocks 102 in engagement with the top ends 221 of the rear-seat front frame bars 22 respectively. When pressed the press member 1002, the two cables (not shown) are stretched to move the pivot pins 1003 to the top ends of the associating sliding slots 17 respectively, thereby disengaging the caps 103 of the associating locating blocks 102 from the top ends 221 of the two rear-seat front frame bars 22 respectively. At this time, the user can turn the handlebar 1 backwardly downwards to the received position. When wishing to set the handlebar 1 in the extended position, press the press member 1002 to move the pivot pins 1003 to the top ends of the associating sliding slots 17, and then turn the handlebar 1 forwardly upwards from the received position to the extended position, and then release the hand from the press member 1002 for enabling the pivot pins 1003 to be moved to the bottom ends of the associating sliding slots 17 by the associating spring members (not shown) to hold the caps 103 of the associating locating blocks 102 in engagement with the top ends 221 of the rear-seat front frame bars 22 respectively.

When wishing to collapse the tandem jogging stroller, detach the front wheel 80 and the rear wheels 71, and then press the press member 1002 to disengage the caps 103 from the top ends 221 of the rear-sear frame bars 22 (see FIGS. 7 and 8), and then turn the handlebar 1 backwardly downwards toward the two rear-seat rear frame bars 21. At this time, the two rear-sear rear frame bars 21 and the two rear-sear front frame bars 22 are turned downwards, and the movable bracket 3 are moved with the two front bottom frame bars 5 backwards along the two rear bottom frame bars 4 to carry the two front-seat front frame bars 61 toward the rear side (see FIG. 9), and therefore the two front-seat rear frame bars 62 are turned backwardly downwards to the collapsed position (see FIG. 10). The spring latches 82 may be further removed from the front wheel bracket 8 and the two front bottom frame bars 5, for enabling the front wheel bracket 8 to be detached from the front bottom frame bars 5 and received with the two rear wheels 71 to the collapsed tandem jogging stroller (see FIG. 12) to further reduce the size for packing and delivery.

As indicated above, the tandem jogging stroller of the present invention has the following benefits.

1. The tandem jogging stroller provides two seats for two young children. Further, the two front bottom frame bars 5 are respectively connected to the movable bracket 3, and the movable bracket 3 is coupled to and movable along the rear bottom frame bars 4. When collapsing the tandem jogging stroller, the movable bracket 3 and the front bottom frame bars 5 are moved backwards along the rear bottom frame bars 4 to reduce the size for storage.

2. The movable bracket 3 serves as a footplate for the resting of the legs of the young child sitting on the rear seat of the tandem jogging stroller.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A tandem jogging stroller comprising:

a handlebar, said handlebar comprising a transversely extending grip and two end rods respectively extended from two ends of said grip and arranged in parallel, said two end rods each having a longitudinal sliding slot and a connector fixedly fastened to a bottom end thereof;

a rear wheel axle, said rear wheel axle having two wheel holders respectively affixed to two distal ends thereof to support a respective rear wheel, said wheel holders each having a barrel and a lug;

two rear-seat rear frame bars, said rear-seat rear frame bars each having a top end respectively pivoted to the end rods of said handlebar with a respective pivot pin, and a bottom end respectively connected to the barrels of the wheel holders at the two ends of said rear wheel axle;

two rear-seat front frame bars respectively coupled to the end rods of said handlebar, said rear-seat front frame bars each having a top end, a locating frame fixedly provided near the top end, said locating frame having two parallel mounting walls pivotally connected to the connector of the associating end rod of said handlebar with a pivot pin, and a bottom end;

two rear-seat side frame bars, said rear-seat side frame bars each having a front end respectively pivoted to said rear-seat front frame bars with a respective pivot pin, and a rear end respectively pivoted to the lugs of the wheel holders at the two ends of said rear wheel axle;

a movable bracket, said movable bracket comprising two side frame, two sliding holes respectively formed in said side frames, and two pairs of upright lugs respectively extended from said side frames and respectively pivoted to the bottom ends of said two rear-seat front frame bars with a respective pivot pin;

two rear bottom frame bars respectively inserted through the sliding holes of said movable bracket, said rear bottom frame bars each having a rear end respectively pivoted to said rear-seat side frame bars with a respective pivot pin and a front end fixedly mounted with a locating frame;

two front bottom frame bars, said front bottom frame bars each having a rear end respectively connected to the side frames of said movable bracket, a front end, and a coupling hole respectively axially formed in the front end;

two front-seat rear frame bars, said front-seat rear frame bars each having a bottom end respectively pivoted to the locating frames of said rear bottom frame bars with a respective pivot pi and a top end fixedly mounted with a locating frame;

two front-seat front frame bars, said front-seat front frame bars each having a top end respectively pivoted to the locating frames of said two front-seat rear frame bars and a bottom end respectively pivoted to the front ends of said two front bottom frame bars with a respective pivot pin;

a reinforcing rod connected between said two front-seat front frame bars; and a front wheel bracket connected to said front bottom frame bars and holding a front wheel.

2. The tandem jogging stroller as claimed in claim 1, wherein said front wheel bracket has two side bars respectively inserted into the coupling holes of said two front bottom frame bars and locked thereto with a respective spring latch.

3. The tandem jogging stroller as claimed in claim 1, wherein said front wheel bracket is directly affixed to said front bottom frame bars; said front wheel is pivotally mounted on said front wheel bracket.

\* \* \* \* \*